United States Patent
Gomez et al.

(10) Patent No.: US 10,810,152 B2
(45) Date of Patent: Oct. 20, 2020

(54) STORAGE DEVICE CARRIER ASSEMBLY

(71) Applicant: HEWLETT-PACKARD DEVELOPMENT COMPANY, L.P., Spring, TX (US)

(72) Inventors: Adolfo Gomez, Fort Collins, CO (US); Tom J. Searby, Fort Collins, CO (US); Omar Guadalupe Pena, Fort Collins, CO (US); Jonathan D. Bassett, Fort Collins, CO (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/238,722

(22) Filed: Jan. 3, 2019

(65) Prior Publication Data
US 2019/0138482 A1 May 9, 2019

Related U.S. Application Data

(63) Continuation of application No. 14/605,909, filed on Jan. 26, 2015, now abandoned.

(51) Int. Cl.
G06F 13/40 (2006.01)
G06F 1/18 (2006.01)
G11B 33/12 (2006.01)

(52) U.S. Cl.
CPC .......... *G06F 13/4068* (2013.01); *G06F 1/187* (2013.01); *G11B 33/128* (2013.01)

(58) Field of Classification Search
CPC ... G06F 1/187; G06F 13/4068; G11B 33/124; G11B 33/128
See application file for complete search history.

(56) References Cited

U.S. PATENT DOCUMENTS

| | | | |
|---|---|---|---|
| 5,921,644 A * | 7/1999 | Brunel | G11B 33/124 312/223.2 |
| 6,058,016 A | 5/2000 | Anderson | |
| 6,088,222 A | 7/2000 | Schmitt | |
| 6,157,540 A | 12/2000 | Eddings | |
| 6,480,391 B1 | 11/2002 | Monson | |
| 6,876,547 B2 | 4/2005 | McAlister | |
| 6,918,174 B2 | 7/2005 | Kim | |

(Continued)

OTHER PUBLICATIONS

"SATA-IO Unveils Revision 3.2 Specification"—2 pages dated Aug. 8, 2013 (Year: 2013).*

(Continued)

*Primary Examiner* — Brian T Misiura
(74) *Attorney, Agent, or Firm* — Fabian VanCott

(57) ABSTRACT

A computing system for housing a number of storage devices includes a number of device cages, and a backplane coupled to each of the device cages to electrically couple a number of the storage devices to the computing system. The backplane includes a number of device combination signal and power interfaces located on a first side of the backplane to couple a number of the storage devices to the backplane. The backplane further includes a number of combination signal and power interfaces located on a second side of the backplane to couple the backplane to the computing system. The backplane further includes a number of signal connectors to couple the backplane to the computing system.

17 Claims, 10 Drawing Sheets

(56) References Cited

U.S. PATENT DOCUMENTS

| | | | |
|---|---|---|---|
| 6,957,291 B2 | 10/2005 | Moon | |
| 6,999,321 B2 | 2/2006 | Suekawa et al. | |
| 7,200,008 B1 | 4/2007 | Bhugra | |
| 7,307,835 B1 | 12/2007 | Barina | |
| 7,312,999 B1 | 12/2007 | Miyamura | |
| 7,321,489 B2 | 1/2008 | McAlister | |
| 7,342,780 B2* | 3/2008 | Scicluna | G11B 33/025 361/679.33 |
| 7,362,566 B1* | 4/2008 | Sivertsen | G06F 1/181 248/638 |
| 7,515,407 B2 | 4/2009 | Goodman | |
| 7,515,410 B1 | 4/2009 | Dingfelder | |
| 7,542,295 B2 | 6/2009 | Imsand | |
| 7,639,492 B2 | 12/2009 | Thomas | |
| 7,808,778 B2 | 10/2010 | Hsu | |
| 7,983,032 B2 | 7/2011 | Walker | |
| 8,023,263 B2 | 9/2011 | Crippen | |
| 8,199,482 B2 | 6/2012 | Sanchez | |
| 8,369,081 B2 | 2/2013 | Chen | |
| 8,369,092 B2 | 2/2013 | Atkins | |
| 8,493,716 B2 | 7/2013 | Scavuzzo | |
| 8,508,928 B2 | 8/2013 | Killen | |
| 8,644,017 B2 | 2/2014 | Dunham et al. | |
| 8,725,946 B2* | 5/2014 | Petersen | G11B 33/128 711/117 |
| 8,749,966 B1 | 6/2014 | Boudreau | |
| 9,042,094 B2 | 5/2015 | Williams | |
| 9,176,915 B2 | 11/2015 | Fu | |
| 9,345,163 B2* | 5/2016 | Venugopal | H05K 7/1487 |
| 9,383,784 B2 | 7/2016 | Lo | |
| 9,460,042 B2 | 10/2016 | Iskandar | |
| 9,468,126 B2 | 10/2016 | Pronozuk | |
| 9,958,912 B2 | 5/2018 | Chen | |
| 2004/0085722 A1 | 5/2004 | Tanzer | |
| 2008/0165490 A1 | 7/2008 | Buckland et al. | |
| 2010/0281199 A1 | 11/2010 | Fu et al. | |
| 2016/0073554 A1 | 3/2016 | Marcade | |
| 2016/0217097 A1 | 7/2016 | Gomez | |

OTHER PUBLICATIONS

"Unisys ES3000 Model 3560R G3 HCS Enterprise Server"; Nov. 9, 2012.

"HP SATA/SAS hard drive and Solid State Drive installation"; 14 Pages; 2011.

"Workstation Support for 2.5" Mass Storage Devices"; 6 Pages; Oct. 2012.

"MB154SP-B 4 In 3 3.5"; SATA Hard DRive Backplane Module"; 4 pages; 2012.

Kevin O'Brien, "Dell PowerEdge R720 12G Review," Feb. 5, 2013; pp. 1-17.

Peter Thomson•, "StarTech USB 3.0 2.5/3.5 SATA/IDE Hard Drive Docking Station Review"; Feb. 5, 2012; pp. 1-6.

\* cited by examiner

STORAGE DEVICE CARRIER ASSEMBLY

BACKGROUND

Computing systems such as desktop computing systems, laptop computing systems, workstations, and server computing systems are capable of providing processing resources, data storage resources, and other computing resources to a user. A user may purchase a computing system that is best suited for his or her computing needs and may include specific internal and external computing resources.

BRIEF DESCRIPTION OF THE DRAWINGS

The accompanying drawings illustrate various examples of the principles described herein and are a part of the specification. The illustrated examples are given merely for illustration, and do not limit the scope of the claims.

Throughout the drawings, identical reference numbers designate similar, but not necessarily identical, elements.

DETAILED DESCRIPTION

Figure 1:
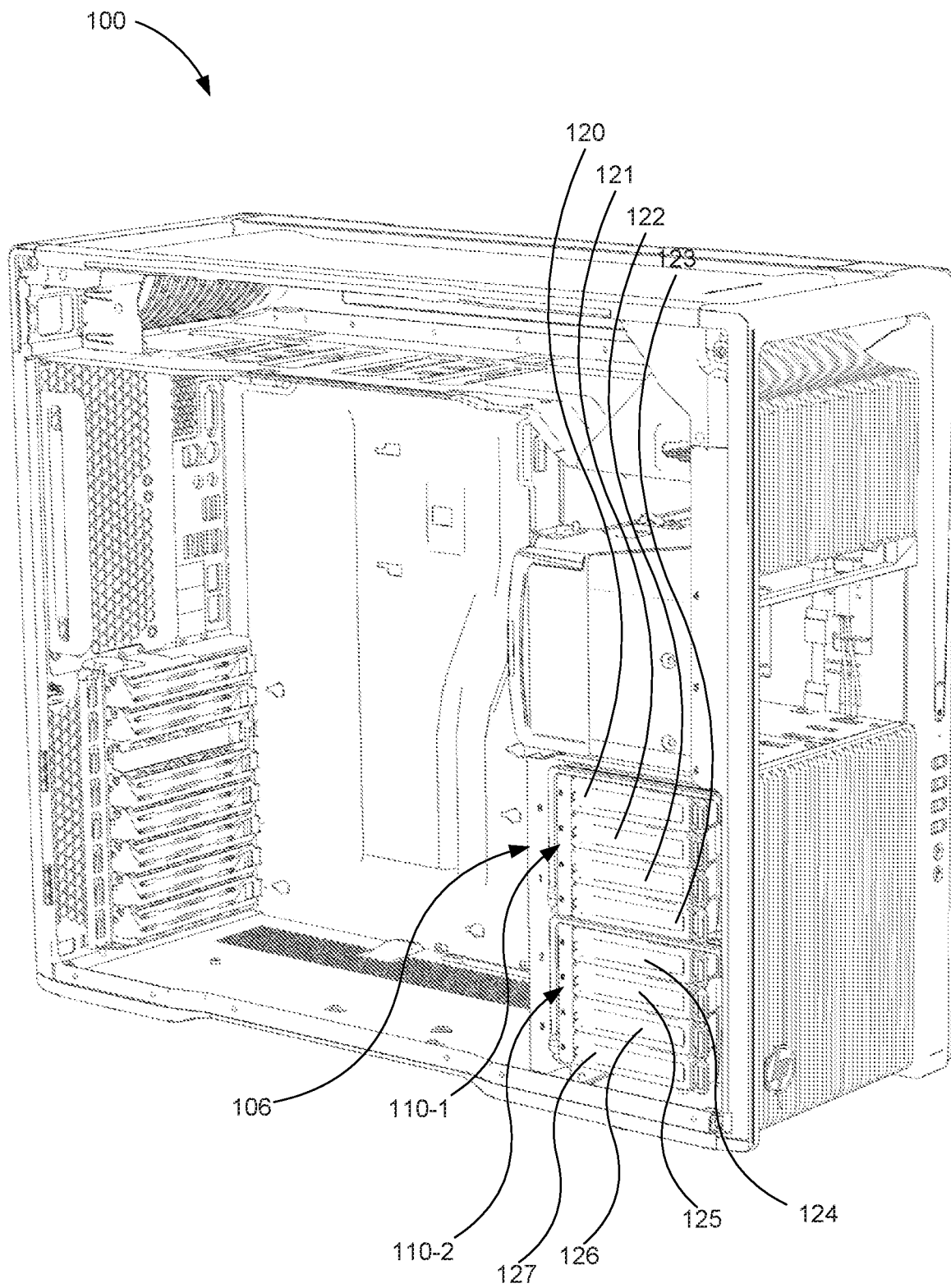
FIG. 1 is a perspective view of a computing system incorporating storage device carrier assemblies, according to one example of the principles described herein.

As mentioned above, a user is able to select and purchase a computing system that is best suited for his or her computing needs and may include specific internal and external computing resources. However, once purchased, it may be very difficult for the user to alter the computing system to fit a new or additional computing need. The modularity and configurability of the user's computing system is severely limited. This may be due to the available space, number of storage bays, and form factor of the devices allowed within the computing system.

If the user, for example, wishes to install a larger number different form factor storage devices, the user is unable to do so because of a lack of interfaces and physical bays available to accommodate the desired number of storage devices. Thus, in order to reconfigure (if allowed or possible) one or more storage devices or obtain storage expansion or additional storage capabilities, several complicated and non-user-friendly steps would be required. Further, removal of several other storage devices may be required, and additional cabling and computer infrastructure may be required. These modifications may not be a tool-free solution. These solutions add cost to the computing system as the computing needs of a user change.

Examples described herein provide a storage device carrier assembly that increases the number of storage bays and allows for independent device access of a plurality of storage devices. The storage device carrier assembly includes a device cage and at least one device cage rail coupled to the outside of the device cage to couple the device cage to a chassis of a computing system. A plurality of storage device carrier rails are coupled to the inside of the device cage to couple a plurality of storage device carriers to the device cage. Each of the storage device carriers houses a storage device.

A backplane is coupled to the device cage to electrically couple a number of the computing resources to the computing system. The backplane includes a number of storage device interfaces located on the first side of the backplane. The storage device interfaces electrically couple a number of the computing resources to the computing system. In one example, the first side of the backplane includes four storage device interfaces to support Serial Attached Small Computer System Interface (SAS) or Serial ATA (SATA) storage devices.

In another example, the first side of the backplane includes two device interfaces to support SAS or SATA storage devices; and two storage device interfaces to support SAS, SATA, or Peripheral Component Interconnect Express (PCIe) storage devices.

In another example, the first side of the backplane includes four storage device interfaces to support SAS, SATA, or PCIe. In this example, the four device interfaces are blind-mate interfaces. In this example, the backplane interfaces located on the first side of the backplane are blind-mate interfaces.

The backplane further includes a number of backplane interfaces located on the second side of the backplane to provide connectivity between the computing resources and the computing system. In this example, the backplane interfaces located on the second side of the backplane are blind-mate interfaces.

In one example, the combination signal and power interfaces located on the first side of the backplane include a number of combination SAS and SATA connectors. In another example, the combination signal and power interfaces located on the first side of the backplane include a number of combination SAS, SATA, and PCIe connectors.

In one example, the backplane further includes a number of signal connectors that couple the backplane to the computing system. In this example, the signal connectors include a number of combination SAS and SATA connectors.

Each of the storage device carrier assemblies includes an assembly latch to couple the storage device carrier assemblies to the computing system chassis. Further, each of the individual storage device carriers includes a storage device carrier latch to couple the storage device carriers to the storage device carrier assembly. Each individual storage device carrier includes a number of retention pins to couple a storage device to the storage device carrier. In one example, each of the storage device carriers includes a stationary rail and a moveable rail opposite the stationary rail. The retention pins are located on the stationary rail and the moveable rail to provide space within the storage device carrier to insert and secure a storage device in the storage device carrier.

With the above computing topology, each of the storage device carriers is independently accessible without removal of the main storage device carrier assembly or another storage device carrier. This provides for a system that eliminates the use of tools to reconfigure the computing system, and allows a user to change the capabilities of the computing system in a highly modular manner.

In one example, the storage device carrier assembly may be sold as an after-market product. In this manner, a user may reconfigure their computing system to accommodate SFF storage devices, LFF storage devices, and combinations thereof. In another example, the storage device carrier assembly may be configured by a computing system manufacturer as a customer-orderable option.

Dimensions of Small Form Factor (SFF) and Large Form Factor (LFF) storage devices as used herein and in the appended claims are those form factors defined by a number of storage industry standards committees.

In one example, a number of graphics may be presented on each of the storage device carriers to indicate proper orientation of the storage device within the storage device carrier. These graphics may include, for example, graphics depicting a storage device's interface. These graphics may be placed on a storage device carrier to indicate to the user that the user is to align and arrange the storage device in a certain orientation with respect to the storage device carrier.

In one example, a plurality of storage device carrier assemblies are coupleable to the chassis of the computing system. In this example, the storage device carrier assemblies are mountable in an internal storage bay of a computing system.

In the following description, for purposes of explanation, numerous specific details are set forth in order to provide a thorough understanding of the present systems and methods. It will be apparent, however, to one skilled in the art that the present apparatus, systems, and methods may be practiced without these specific details, and that these specific details are non-limiting. Reference in the specification to "an example" or similar language means that a particular feature, structure, or characteristic described in connection with that example is included as described, but may not be included in other examples.

Turning now to the figures, FIG. 1 is a perspective view of a computing system (100) incorporating storage device carrier assemblies (110-1, 110-2), according to one example of the principles described herein. The computing system (100) of FIG. 1 may be, for example, a desktop computer, a laptop computer, a server computing system, a workstation, or other type of computing system.

The computing system (100) includes internal drive space (106) that includes a number of internal storage bays that can be utilized for electrically coupling an increased number of smaller storage devices (FIG. 2, 111 through 118) to the computing system (100). The storage devices (FIG. 2, 111 through 118) are coupled to the computing system (100) via a number of storage device carrier assemblies (110-1, 110-2). The storage device carrier assemblies (110-1, 110-2) are mountable to the chassis of the computing system (100). Although two storage device carrier assemblies (110-1, 110-2) are depicted in FIG. 1, any number of storage device carrier assemblies may be coupled to the computing system (100).

Each of the storage device carrier assemblies (110-1, 110-2) includes a number of storage device carriers (120 through 127) housing a storage device. The storage device carriers (120 through 127) will be described in more detail below. However, each storage device carrier (120 through 127) houses a SFF storage device. Computing technology has advanced such that the size of storage devices such as those depicted in FIG. 2, as elements 111 through 118, are smaller than a LFF storage device.

As used in the present specification and in the appended claims, the terms "small form factor" or "SFF" is meant to be understood broadly as any storage device of reduced volume relative to a large form factor storage device. In one example, an SFF storage device is a storage device with a form factor defined by storage industry standards committees. The standards are loosely based on the internal disk or platter diameter within a hard disk drive. These diameters were 2.5 inches for what, at the time, the industry defined as a SFF device, and 3.5 inches for what, at the time, the industry defined as a LFF device. These dimension no longer indicate actual physical dimensions of computing devices such as data storage devices, and have no physical meaning when dealing with, for example, solid state drives. Thus, the terms "SFF" and "LFF" indicate the overall physical drive size, even though they are not related to the outer dimensions. In one example, both SFF and LFF form factors may be defined by a fixed width and depth. However, any number of height dimensions may be utilized in both a SFF device and LFF device. Thus, throughout the present specification and in the appended claims, SFF and LFF devices will be described without reference to specific physical dimensions.

In many computing systems, four LFF storage devices may be mounted within the internal drive space (106) of a computing system (100). Examples described herein, however, double the storage device capacity from four LFF storage devices to eight SFF storage devices. Further, the examples described herein also provide for an extremely versatile computing system (100) that can accommodate for installation of a variety of different form factor storage devices in a common drive space while providing for independent and individual insertion and removal of the storage devices irrespective of their form factor without having to remove other storage devices.

Further, in some examples, the computing system (100) as a base unit are enabled with the features described herein. In this example, the computing system provides an extensive degree of modularity not provided by other systems that do not include these features. Not providing these features in a computing system adds significant costs to a manufacturer and a user who purchases the base system because of the need to provide a wide range of specialty devices. Further, computing systems that do not utilize the features described herein lack independent drive access such that a multi-storage device carrier must be removed to access individual drives. Examples described herein eliminate these disadvantages.

Turning back to FIG. 1, the storage devices housed by the storage device carriers (120 through 127) may include any computing device that may be coupled to the computing system (100), its associated motherboard, and other base computing components. Thus, although storage devices are described throughout the present specification, these storage devices are one of many examples of computer-associated devices that may be utilized within the examples of the present systems and methods.

In one example, the storage devices housed by the storage device carriers (120 through 127) are data storage devices.

In this example, the storage devices may be Hard Disk Drives (HDDs) or Solid State Devices (SSDs). In another example, the storage devices housed by the storage device carriers (120 through 127) are data processing devices or data transmission devices, among other types of computing systems. Each storage device may be different in form factor and function as another storage device. In another example, the storage devices housed by the storage device carriers (120 through 127) are storage devices that utilize Serial ATA (SATA) interfaces, storage devices that utilize Serial Attached Small Computer System Interface (SAS) interfaces, storage devices that utilize Peripheral Component Interconnect Express (PCIe) interfaces, other types of computing interfaces, and combinations thereof. Each storage device may utilize a computing interface different from another storage device.

Figure 2:
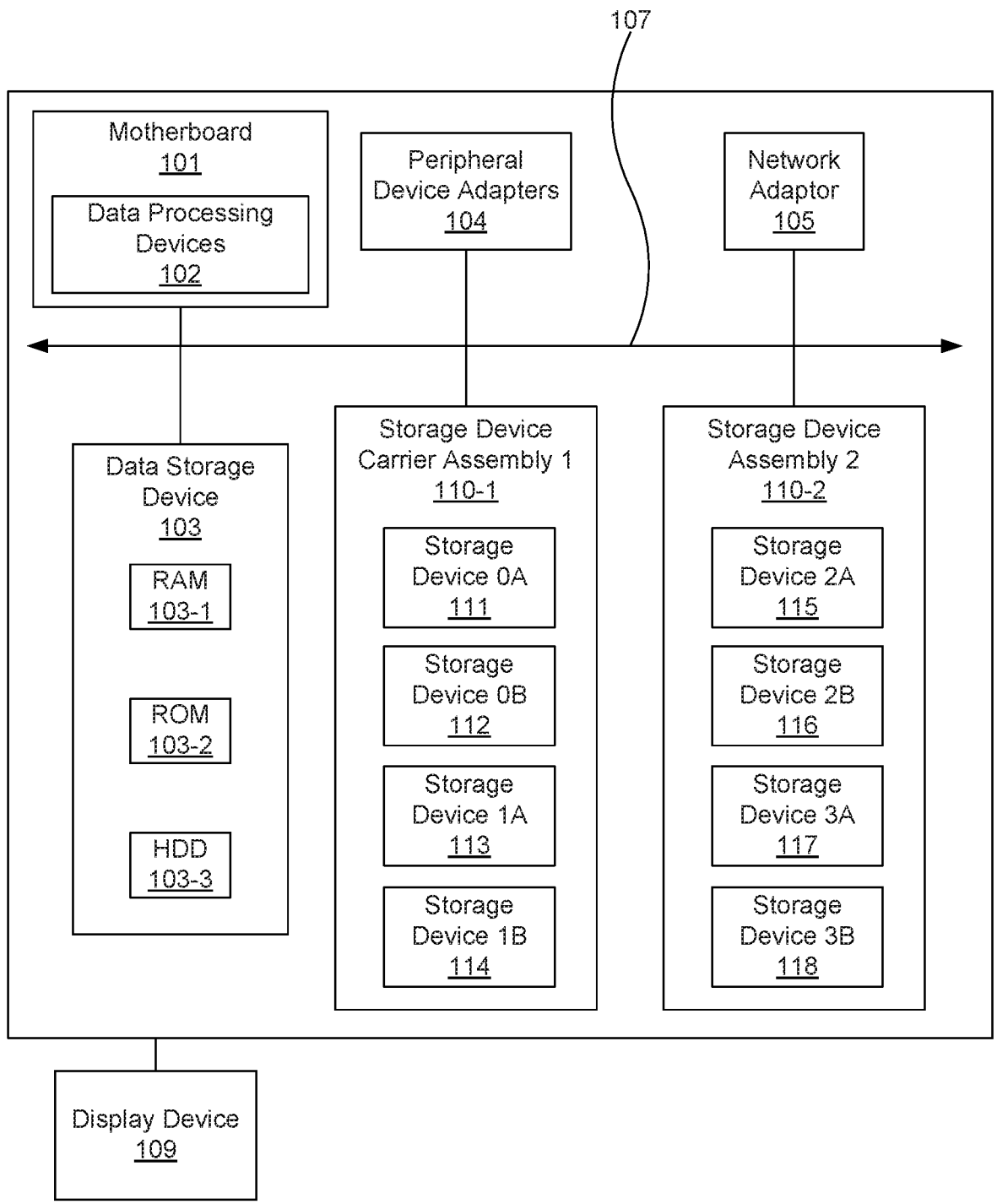
FIG. 2 is a block diagram of the computing system of FIG. 1, according to one example of the principles described herein.

FIG. 2 is a block diagram of the computing system (100) of FIG. 1, according to one example of the principles described herein. The computing system (100) may be implemented in an electronic device. Examples of electronic devices include servers, desktop computers, laptop computers, Personal Digital Assistants (PDAs), mobile devices, smartphones, gaming systems, and tablets, among other electronic devices.

The computing system (100) may be utilized in any data processing scenario including, stand-alone hardware, mobile applications, through a computing network, or combinations thereof. Further, the computing system (100) may be used in a computing network, a public cloud network, a private cloud network, a hybrid cloud network, other forms of networks, or combinations thereof.

To achieve its desired functionality, the computing system (100) includes various hardware components. Among these hardware components may be a motherboard (101), number of processors (102) on the motherboard (101), a number of data storage devices (103), a number of peripheral device adapters (104), and a number of network adapters (105). These hardware components may be interconnected through the use of a number of busses and/or network connections. In one example, the motherboard (101), processor (102), data storage devices (103), peripheral device adapters (104), and a network adapter (105) may be communicatively coupled via a bus (107).

The motherboard (101) and processors (102) may include the hardware architecture to retrieve executable code from the data storage device (103) and execute the executable code. The executable code may, when executed by the processors (102), cause the processors (102) to implement at least the functionality of receiving signals from the storage devices (111 through 118) housed within the storage device carriers (120 through 127) of the storage device carrier assemblies (110-1, 110-2), and processing those signals. In the course of executing code, the processors (102) may receive input from and provide output to a number of the remaining hardware units.

The data storage devices (103) may store data such as executable program code that is executed by the processor (102) or other processing device. As will be discussed, the data storage device (103) may specifically store computer code representing a number of applications that the processors (102) execute to implement at least the functionality described herein.

The data storage device (103) may include various types of memory modules, including volatile and nonvolatile memory in addition to the storage devices (111 through 118). For example, the data storage device (103) of the present example includes Random Access Memory (RAM) (103-1), Read Only Memory (ROM) (103-2), and Hard Disk Drive (HDD) memory (103-3). Many other types of memory may also be utilized, and the present specification contemplates the use of many varying type(s) of memory in the data storage device (103) as may suit a particular application of the principles described herein. In certain examples, different types of memory in the data storage device (103) may be used for different data storage needs. For example, in certain examples the processors (102) may boot from ROM (103-2), maintain nonvolatile storage in the HDD memory (103-3), and execute program code stored in RAM (103-1).

Data storage devices described herein including the data storage device (103) and the storage devices (111 through 118) may include a computer readable medium, a computer readable storage medium, or a non-transitory computer readable medium, among others. For example, the data storage device (103) and the storage devices (111 through 118) may be, but not limited to, an electronic, magnetic, optical, electromagnetic, infrared, or semiconductor system, apparatus, or device, or any suitable combination of the foregoing. More specific examples of the computer readable storage medium may include, for example, the following: an electrical connection having a number of wires, a portable computer diskette, a hard disk, a RAM, a ROM, an Erasable Programmable Read-Only Memory (EPROM or Flash memory), a portable Compact Disc Read-Only Memory (CD-ROM), an optical storage device, a magnetic storage device, or any suitable combination of the foregoing. In the context of this document, a computer readable storage medium may be any tangible medium that can contain, or store computer usable program code for use by or in connection with an instruction execution system, apparatus, or device. In another example, a computer readable storage medium may be any non-transitory medium that can contain, or store a program for use by or in connection with an instruction execution system, apparatus, or device.

The hardware adapters (104, 105) in the computing system (100) enable the processors (102) to interface with various other hardware elements, external and internal to the computing system (100) including the storage devices (111 through 118) within the data storage carriers (110-1, 110-2). For example, the peripheral device adapters (104) may provide an interface to input/output devices, such as, for example, a display device (109), a mouse, or a keyboard. The peripheral device adapters (104) may also provide access to other external devices such as an external storage device, a number of network devices such as, for example, servers, switches, and routers, client devices, other types of computing systems, and combinations thereof.

The display device (109) may be provided to allow a user of the computing system (100) to interact with and implement the functionality of the computing system (100). The peripheral device adapters (104) may also create an interface between the processors (102) and the display device (109), a printer, or other media output devices. The network adapter (105) may provide an interface to other computing systems within, for example, a network, thereby enabling the transmission of data between the computing system (100) and other devices located within the network.

The computing system (100) may, when executed by the processors (102), display the number of Graphical User Interfaces (GUIs) on the display device (109) associated with the executable program code representing the number of applications stored on the data storage device (103) and the storage devices (111 through 118). The GUIs may include aspects of the executable code including display of interactive windows that provide a user with the ability to instruct the computing system (100) and it various components to perform a number of tasks. Examples of display devices (109) include a computer screen, a laptop screen, a mobile device screen, a PDA screen, and a tablet screen, among other display devices (109).

Figure 3:
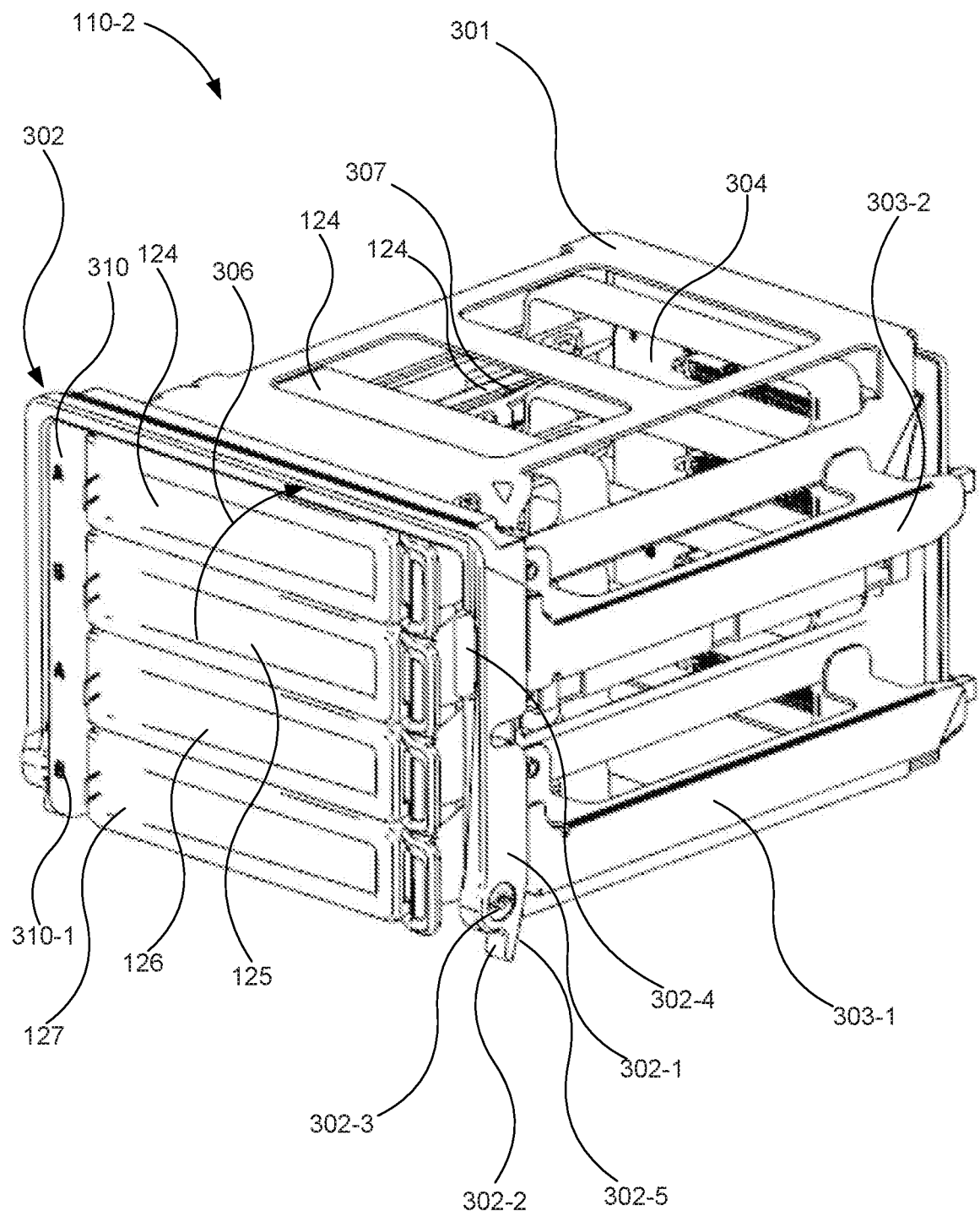
FIG. 3 is a perspective view of a storage device carrier assembly of FIG. 1, according to one example of the principles described herein.

FIG. 3 is a perspective view of a storage device carrier assembly (110-1, 110-2) of FIG. 1, according to one example of the principles described herein. As depicted in FIG. 3, the storage device carrier assemblies (110-1, 110-2), collectively referred to as 110, house a number of the storage device carriers (120 through 127) that, in turn, house the storage devices (FIG. 2, 111 through 118). The storage device carriers (124 through 127) of the second storage device carrier assembly (110-2) are depicted in FIG. 3. In one example, the number of storage device carriers (120 through 127) a storage device carrier assembly (110-1, 110-2) may house is up to four. The storage device carriers (124 through 127) depicted in FIG. 3 are not depicted with the storage devices (FIG. 2, 111 through 118) housed therein.

The storage device carrier assemblies (110-1, 110-2) include a frame (301) to enclose the storage device carriers (120 through 127) and align the storage device carriers (120 through 127) within the storage device carrier assemblies (110-1, 110-2). In one example, the frame (301) is made of sheet metal. In another example, the frame is made of a polymer material.

The storage device carrier assemblies (110-1, 110-2) include a lever operated cam assembly (302) used to physically couple the storage device carrier assemblies (110-1, 110-2) to the chassis of the computing system (100). The lever operated cam assembly (302) includes a handle (302-1), a chassis pin notch (302-2) defined within the handle (302-1), a cam pivot (302-3) to pivot the handle about a pivot point defined by the cam pivot (302-3), a cam latch (302-4) to secure the handle (302-1) in a closed position, and a number of alignment rails (303-1, 303-2). The alignment rails (303-1, 303-2) assist in proper alignment of the storage device carrier assemblies (110-1, 110-2) relative to the interior of the internal drive space (106) and a number of data transmission interfaces located at the back of the internal drive space (106). The alignment rails (303-1, 303-2) are located on both sides of the storage device carrier assemblies (110-1, 110-2). Although two alignment rails (303-1, 303-2) are depicted in FIG. 3, any number of (303-1, 303-2) may be included along both sides of the storage device carrier assemblies (110-1, 110-2).

The storage device carrier assemblies (110-1, 110-2) are coupled to the internal drive space (106) by aligning the storage device carrier assemblies (110-1, 110-2) into the internal drive space (106) using the alignment rails (303-1, 303-2) of the storage device carrier assemblies (110-1, 110-2) and a corresponding number of chassis channels defined within the internal drive space (106). The handle (302-1) is used to carry the storage device carrier assemblies (110-1, 110-2) and position them relative to the internal drive space (106).

As will be described in more detail below, as the storage device carrier assemblies (110-1, 110-2) reach the back of the internal drive space (106), a number of blind-mate connectors located on a computing system side (i.e., back side) of a backplane (304) of the storage device carrier assemblies (110-1, 110-2) shown in FIGS. 7 and 8 engage with mating blind-mate connectors located within the internal drive space (106).

As used in the present specification and in the appended claims, the term "blind-mate connector" is meant to be understood broadly as any connection between two computing devices or systems that can be accomplished without tools. In one example, a blind-mate connector is any connection that may be coupled to a mating blind-mate connector without a user having line of sight to assist in alignment or coupling and without user interaction to facilitate in the coupling of the mating blind-mate connectors. In one example, blind-mate connectors include self-aligning features that provide alignment when mating.

In order to lock the storage device carrier assemblies (110-1, 110-2) into the internal drive space (106) after coupling the mating blind-mate connectors, the handle (302-1) is rotated about the cam pivot (302-3) as indicated by arrow 306 to a closed position where the cam latch (302-4) engages with the handle (302-1) and prevents the handle (302-1) from moving in an opposite direction of arrow 306. Simultaneous to the rotation of the handle (302-1) and engagement of the handle (302-1) with the cam latch (302-4), the chassis pin notch (302-2) defined within the handle (302-1) engages with a chassis pin located within the internal drive space (106) preventing the storage device carrier assemblies (110-1, 110-2) from being removed from the internal drive space (106). In this manner, the lever operated cam assembly (302) secures the storage device carrier assemblies (110-1, 110-2) in the internal drive space (106). In one example, the handle (302-1) of the lever operated cam assembly (302) is spring biased in the direction opposite arrow 306 such that when the handle (302-1) is disengaged from the cam latch (302-4), the handle (302-1) rotates in an open position. In this example, the cam pivot (302-3) is a spring-biased pivot. In one example, the handle (302) is spring loaded to extend to less of a rotation than parallel with the bottom of the storage device carrier assembly (110-1, 110-2) to allow the user access to the handle (302). The user may then rotate the handle (302) to cam/lever the storage device carrier assembly out of the internal storage bay. In this example, the back surface (302-5) of the chassis pin notch (302-2) presses/cams on a surface or wall in the internal storage bay of the chassis. This lever action disengages the blind-mate connection by overcoming the friction associated with the blind-mate connection, and allows the user to easily slide the storage device carrier assembly (110-1, 110-2) out of the internal storage bay.

Although a lever operated cam assembly (302) is depicted and used to couple the storage device carrier assemblies (110-1, 110-2) to the internal drive space (106), any assembly may be used.

The storage device carrier assemblies (110-1, 110-2) further include a backplane (304). The backplane (304) provides electrical interconnectivity between the storage devices (111 through 118) housed within the storage device carriers (120 through 127) of the storage device carrier assemblies (110-1, 110-2) and a number of blind-mate connectors located within the internal drive space (106). In this manner, electrical signals are transmitted between the storage devices (111 through 118) and the motherboard (FIG. 1, 101) of the computing system (100).

In order to align and seat the storage device carriers (120 through 127) and their respective storage devices (111 through 118) with a number of blind-mate connectors located on the storage device side of the backplane (304), the frame (301) includes a number of alignment guides (307) upon which each of the storage device carriers (120 through 127) seat. The bottom storage device carrier (123, 127) may utilize an alignment guide (307), or may use the bottom of the frame (301) in place of an alignment guide (307).

Figure 4:
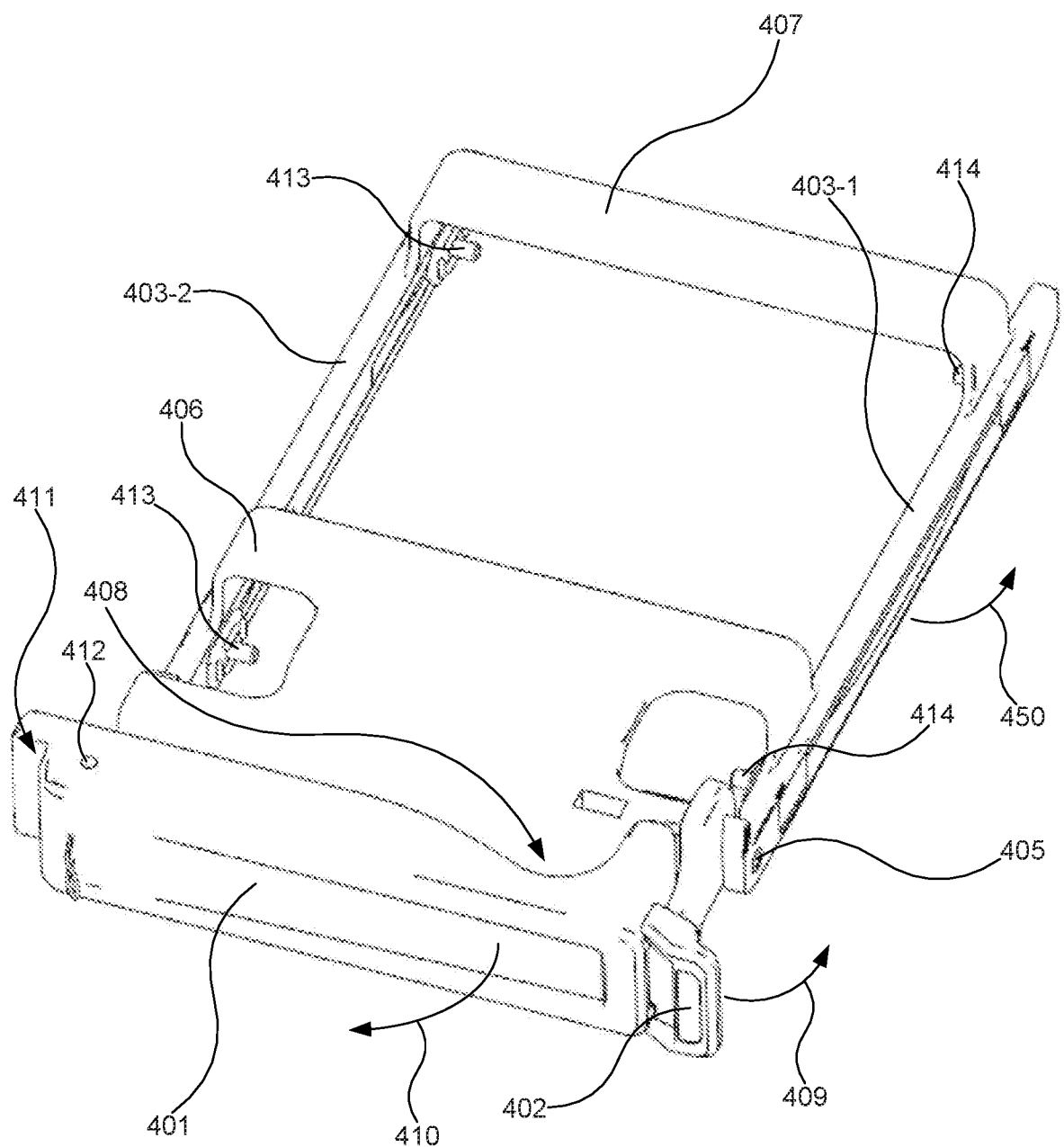
FIG. 4 is a top perspective view of an individual storage device carrier of the storage device carrier assembly of FIG. 3, according to one example of the principles described herein.
Figure 5:
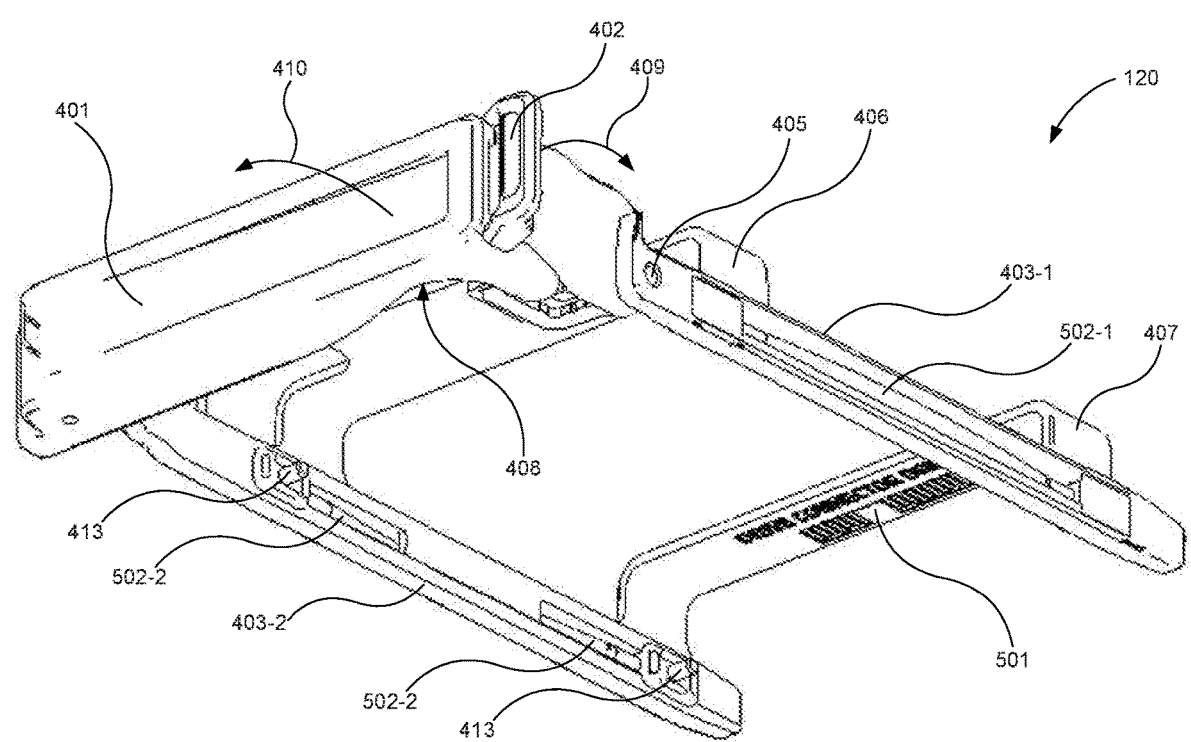
FIG. 5 is a bottom perspective view of the individual storage device carrier of the storage device carrier assembly of FIG. 3, according to one example of the principles described herein.

FIG. 4 is a top perspective view of a storage device carrier (120 through 127) of the storage device carrier assembly (110-1, 110-2) of FIG. 3, according to one example of the principles described herein. FIG. 5 is a bottom perspective view of the storage device carrier (120 through 127) of the storage device carrier assembly (110-1, 110-2) of FIG. 3, according to one example of the principles described herein. In one example, the storage device carriers (120 through 127) are made of a polymer. The storage device carriers (120 through 127) include a first rib (406) and a second rib (407) coupled to or formed out of the same piece of material as two storage device carrier rails (403-1, 403-2). The storage device carrier rails (403-1, 403-2) are the portion of the storage device carriers (120 through 127) that rest on the alignment guides (FIG. 3, 307) of the storage device carrier assembly (110-1, 110-2). In one example, the first rib (406), second rib (407), and storage device carrier rails (403-1, 403-2) are dimensioned to fit a SFF storage device.

The storage device carrier rails (403-1, 403-2) include a number of carrier rail pins (413, 414). The storage device carrier rails (403-1, 403-2) include a stationary rail (403-2) and a flexible rail (403-1) so that when the flexible rail (403-1) is disengaged from the carrier handle release lever (402) via retention pin (405) and moved in the direction of arrow 410, a storage device (FIG. 1, 111 through 118) may be inserted into the storage device carrier (120 through 127). In another example, the flexible rail (403-1) may rotate about a number of pivots formed within the first rib (406) and the second rib (407).

The carrier rail pins (413) of the stationary rail (403-2) engage with a number of storage device mounting holes. Thereafter, the flexible rail (403-1) may be allowed to return from a flexed position in the direction opposite arrow 410 to engage the carrier rail pins (414) of the flexible rail (403-1) with a number of additional storage device mounting holes. In one example, the position of the carrier rail pins (413, 414) of the storage device carrier (120 through 127) are defined by the location of the mounting holes in the storage device. In this example, the position of the mounting holes defined within the storage device may be an industry standard defined by a number of technology committees or a manufacturer. The flexible rail (403-1), after the carrier rail pins (414) of the flexible rail (403-1) engage with the additional storage device mounting holes, reengages with the retention pin (405) on the carrier handle release lever (402) to secure the flexible rail (403-1).

In one example, the carrier rail pins (413, 414) are secured within a number of elastomeric material or other material that is able to resume its original shape when a deforming force is removed. In this example, the carrier rail pins (413, 414) act to reduce or eliminate vibrations that may be experienced by the storage devices (FIG. 2, 111 through 118) housed within the storage device carriers (120 through 127). The carrier rail pins (413, 414) in this example act as vibration isolation and damping devices. In one example, the carrier rail pins (413, 414) are molded into the storage device carriers (120 through 127).

In one example, a number of Electromagnetic Compatibility (EMC) grounding wires (502-1, 502-2) may be used to couple the storage device to the storage device carriers (120 through 127), and the storage device carriers to the storage device carrier assemblies, which in turn has features to make a ground coupling with the computing system (100) such as the chassis to reduce electromagnetic interference within the system. In this example, the grounding wire may also serve as a mechanical retention mechanism for retaining the storage device. In the example depicted in FIGS. 4 and 5, the EMC grounding wires (502-1, 502-2) and the retention pins (413, 414) are formed from the same piece of material. In this manner, the EMC grounding wires (502-1, 502-2) are positioned through portions of the flexible rail (403-1) and the stationary rail (403-2), and the ends of the EMC grounding wires (502-1, 502-2) form the retention pins (413, 414).

In one example, alignment indicia (FIG. 5, 501) may be formed on the storage device carrier (120 through 127). The alignment indicia (FIG. 5, 501) may assist a user in understanding the correct orientation at which a storage device (111 through 118) engages with the storage device carrier (120 through 127). In one example, the alignment indicia (FIG. 5, 501) may include a graphic such as a graphic of a pin layout of the storage device (111 through 118) connector so that the user can identify a pin layout of the storage device (111 through 118) connector and match it with the graphic of a pin layout formed in the storage device carrier (120 through 127).

Having described how a storage device (111 through 118) engages with the storage device carrier (120 through 127), the method of engaging the storage device carrier (120 through 127) with the storage device carrier assemblies (110-1, 110-2) will now be described. The storage device carrier (120 through 127) includes a carrier handle (401), a carrier handle release lever (402), and a carrier camming lever (411). The storage device carrier (120 through 127) is installed into the storage device carrier assembly (110-1, 110-2) by releasing the carrier handle (401). The carrier handle (401) is released by moving the carrier handle release lever (402) in the direction indicated by arrow 409. Once the carrier handle release lever (402) is disengaged from the carrier handle (401), the carrier handle (401) may then move in the direction of arrow 410 about a carrier pivot pin (412). In one example, the carrier handle (401) is biased in a position of disengagement from the carrier handle release lever (402) and in an open position using a spring positioned between the first rib (406) and the carrier handle (401). The carrier handle (401) includes a number of gripping features (408) that assist a user in gripping the storage device carrier (120 through 127).

The storage device carrier (120 through 127) may be gripped by the carrier handle (401) and placed in a slot created within the storage device carrier assemblies (110-1, 110-2) by the alignment guides (307). The storage device carrier (120 through 127) is slid into position within a storage device carrier assembly (110-1, 110-2) along the alignment guides (307) until the storage device carrier (120 through 127) reaches the back of the storage device carrier assembly (110-1, 110-2). At this point, a storage device (FIG. 2, 111 through 118) engaged within the storage device carrier (120 through 127) engages with a number of blindmate interfaces located on the storage device side of the backplane (FIG. 3, 304).

Once the storage device (FIG. 2, 111 through 118) is coupled to the backplane (304), the storage device carrier (120 through 127) may be retained within the storage device carrier assembly (110-1, 110-2) via the carrier handle release lever (402), the carrier camming lever (411) of the carrier handle (401), and a carrier retention wall formed by the carrier frame (301) of the storage device carrier assembly (110-1, 110-2). The carrier handle (401) is moved in a direction opposite arrow 410, and locked into a closed position by the carrier handle release lever (402). Simultaneously, the carrier camming lever (411) of the carrier handle (401) engages with a carrier retention wall formed by the carrier frame (301) located behind the cosmetic trim (FIG. 3, 310) of the storage device carrier assembly (110-1, 110-2). In this manner, the carrier camming lever (411), when seated behind the carrier retention bar (FIG. 3, 310), retains the storage device carrier (120 through 127) within the storage device carrier assembly (110-1, 110-2). Further, the cosmetic trim (FIG. 3, 310) may include a number of carrier indicia (310-1) to indicate to a user the identity of the storage device inserted into a particular slot within the storage device carrier assembly (110-1, 110-2). The carrier indicia (310-1) may include numbers, letters, or combinations thereof.

Figure 6:
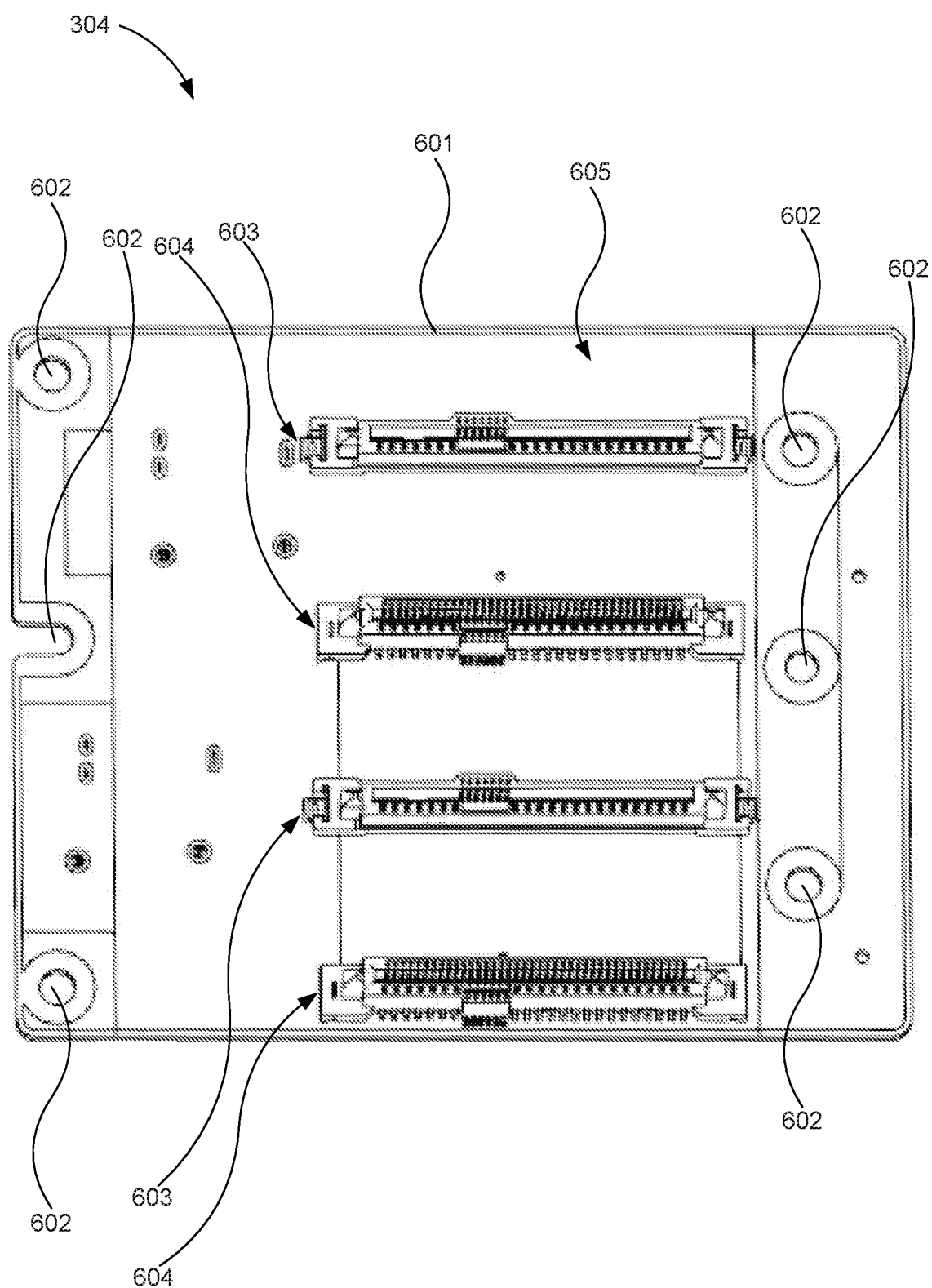
FIG. 6 is a front view of a first side of a backplane coupled to the storage device carrier assembly of FIG. 3, according to one example of the principles described herein.

FIG. 6 is a front view of a first side (605) of a backplane (601) coupled to the storage device carrier (110-1, 110-2) of FIG. 3, according to one example of the principles described herein. The backplane (601) of the storage device carrier (110-1, 110-2) provides for signal transmission between the storage devices (FIG. 2, 111 through 118) and the motherboard (FIG. 2, 101) of the computing system (100).

Figure 7:
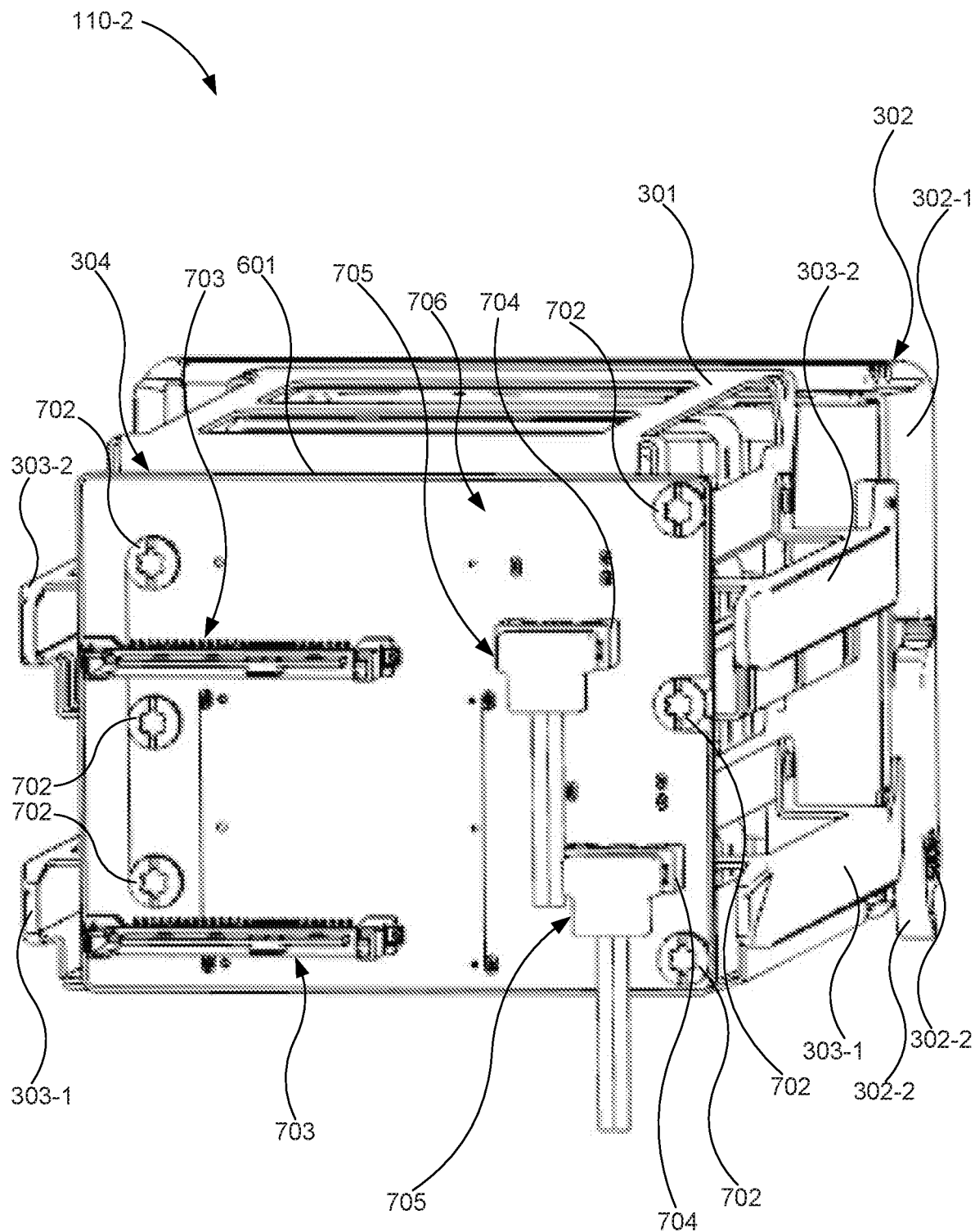
FIG. 7 is a rear perspective view of the storage device carrier assembly of FIG. 3 depicting a second side of a backplane of FIG. 6, according to one example of the principles described herein.

The backplane (601) is a Printed Circuit Assembly (PCA) with a number of electrical traces between a number of interfaces located on the first side (605) and a number of interfaces located on a second side (FIG. 7, 706). The backplane (601) is coupled to the storage device carrier assembly (110-1, 110-2) carrier frame (FIG. 3, 301) via a number of mounting holes (602) and mounting screws (FIG. 7, 702). The backplane (601) is coupled to the storage device carrier assembly (110-1, 110-2) carrier frame (FIG. 3, 301) such that the interfaces (603, 604) on the first side (605) of the backplane (601) align and mate with the storage devices (111 through 118) housed within the storage device carriers (120 through 127). As mentioned above, the connection between the storage devices (111 through 118) and the interfaces (603, 604) on the first side (605) of the backplane (601) is a blind-mate connection.

The interfaces (603, 604) on the first side (605) of the backplane (601) include any type of interface the storage devices (111 through 118) use to communicate with the motherboard (101). The interfaces (603, 604) may be SAS interfaces, SATA interfaces, PCIe interfaces, combination SAS and SATA interfaces, combination SAS, SATA, and PCIe interfaces, other types of interfaces, or combinations thereof.

In one example, interfaces (603) are combination SAS and SATA interfaces. In another example, interfaces (604) are combination SAS, SATA and PCIe interfaces. In these examples, the interface connectors (603, 604) are arranged along the backplane (601) such that the storage devices (FIG. 2, 111 through 118) housed in the storage device carriers (120 through 127) blind-mate with the connectors as the storage devices (FIG. 2, 111 through 118) are inserted into the storage device carrier assemblies (110-1, 110-2).

Each of the storage device carrier assemblies (110-1, 110-2) will accommodate for up to four storage devices. In this example, four SFF storage devices utilize the two combination SAS/SATA interface connectors (603) and the two combination SAS/SATA/PCIe interface connectors (604). In this manner, an internal drive space (106) that, for example, includes four internal LFF storage bays, may be converted into eight SFF internal storage bays. In one example, the present storage device carrier assemblies (110-1, 110-2) can scale up or scale down the number of storage devices that can couple to the computing system (100). For example, one LFF storage bay may be converted into two SFF storage bays, two LFF storage bays may be converted into four SFF storage bays, three LFF storage bay may be converted into six SFF storage bays, and so on.

FIG. 7 is a rear perspective view of the storage device carrier assembly (110-1, 110-2) of FIG. 3 depicting a second side (706) of the backplane (601) of FIG. 6, according to one example of the principles described herein. In the example of FIG. 7, the backplane (601) is depicted as being coupled to the storage device carrier (110-1, 110-2) via a number of the mounting screws (702).

The second side (706) of the backplane (601) includes a number of blind-mate interface connectors (703) that are used to couple the backplane (601) to a corresponding number of interface connectors located in a backplane of the internal drive space (106) of the computing system (100). In one example, two combination SAS/SATA connectors (703) are included on the second side (706) of the backplane (601) of each of the storage device carrier assemblies (110-1, 110-2). In this example, the SAS/SATA connectors (703) provide both signal transmission for four of the storage devices (111 through 118) and power transmission to all eight of the interface connectors (603, 604) of the first side (605) of a backplane (601) for the two storage device carrier assemblies (110-1, 110-2). This, in turn, provides power to all storage devices (111 through 118) utilizing those interface connectors (603, 604). Thus, the computer system combined signal and power cables provide power to the storage devices (111 through 118) and route signals to the motherboard (101) of the computing system (100) or an add-in adapter card located in the computing system (100).

The second side (706) of the backplane (601) of each of the storage device carrier assemblies (110-1, 110-2) also include a number of interface connectors (704) which provide signal transmission for four storage devices (111 through 118). Interface cables (705) are depicted in FIG. 7 as coupling with the interface connectors (704). In this manner, two of the four storage devices (111 through 118) within one of the storage device carrier assemblies (110-1, 110-2) connect to the computing system (100) via the two interfaces (703) and the remaining two of the four storage devices (111 through 118) connect to the computing system (100) via the two interface cables (705).

Figure 8:
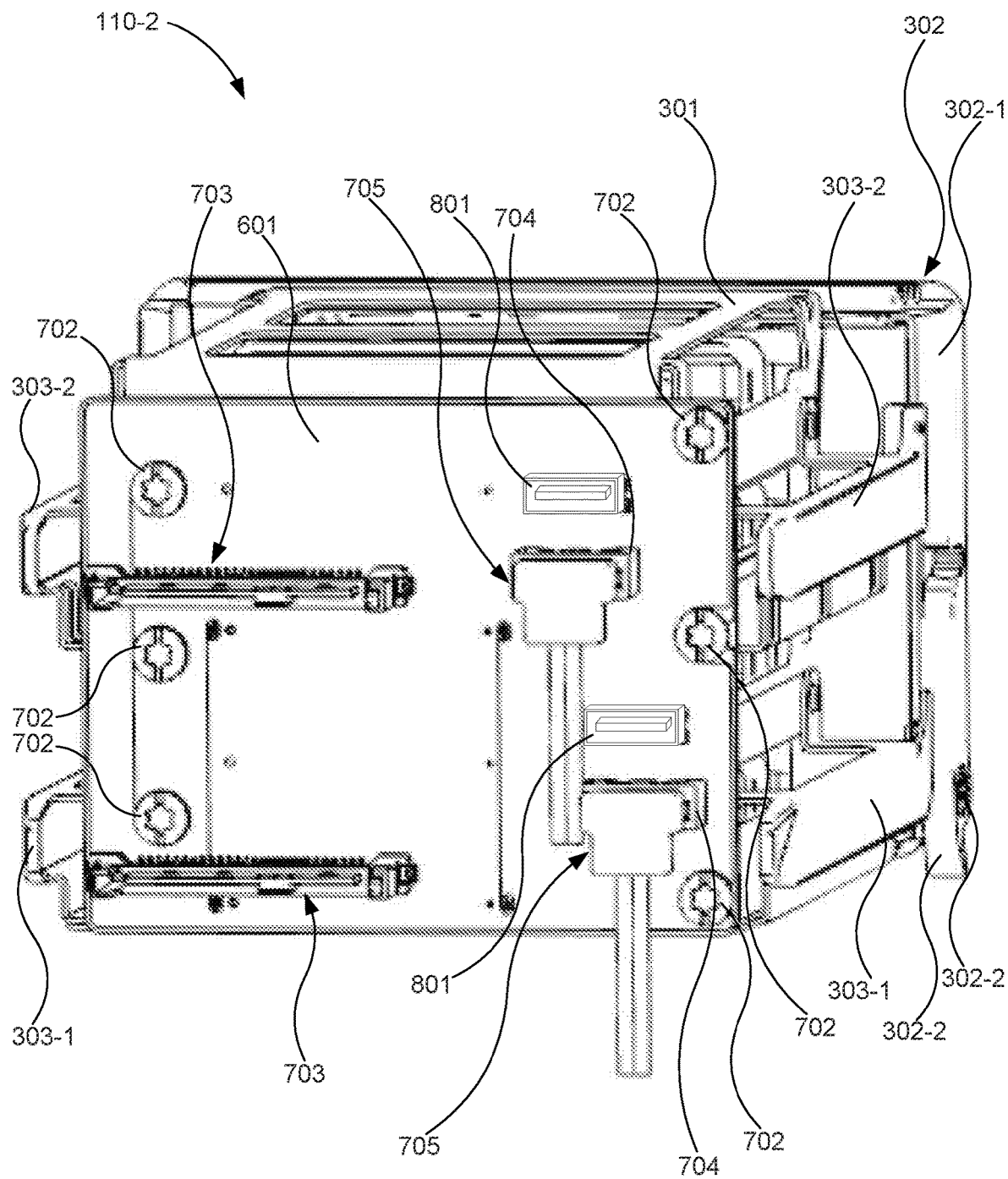
FIG. 8 is a rear perspective view of the storage device carrier assembly of FIG. 3 depicting a second side of a backplane of FIG. 6 including a number of Peripheral Component Interconnect Express (PCIe) interfaces, according to another example of the principles described herein.

FIG. 8 is a rear perspective view of the storage device carrier assembly (110-1, 110-2) of FIG. 3 depicting a second side (706) of the backplane (601) of FIG. 6 including a number of PCIe interfaces (801), according to another example of the principles described herein. Similar elements of FIG. 7 are depicted in FIG. 8. The example of FIG. 8 further includes the PCIe interfaces (801) through which PCIe storage devices and other storage devices (111 through 118) of similar form factor are supported utilizing the PCIe interfaces (801). In one example, the backplane (601) provides two PCIe connectors (801) to manage the signal transmission of the PCIe storage devices (111 through 118) that may be installed within the storage device carrier assemblies (110-1, 110-2).

Figure 9:
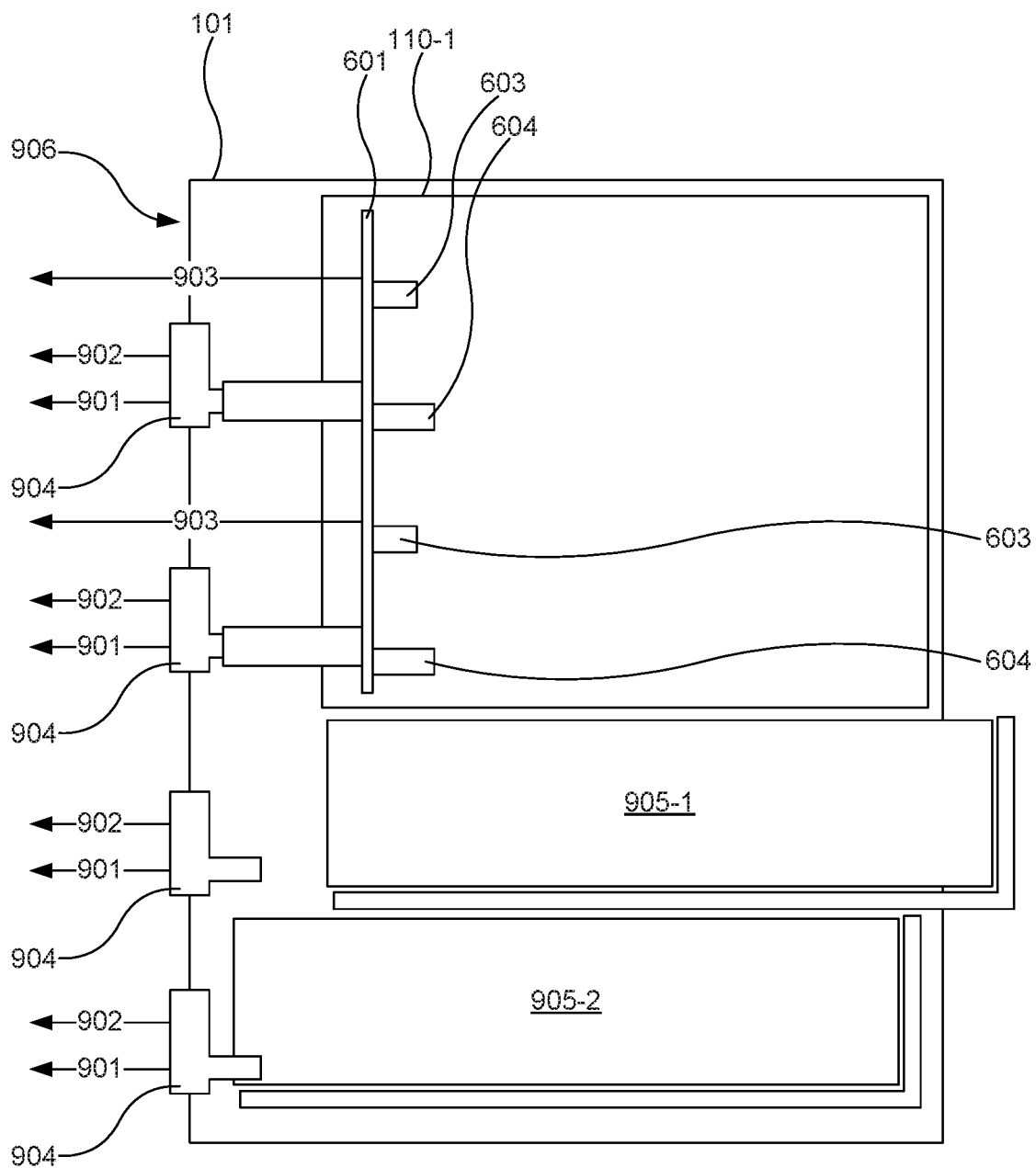
FIG. 9 is a block diagram of an internal storage bay of FIG. 1 depicting a storage device carrier assembly inserted therein, according to one example of the principles described herein.
Figure 10:
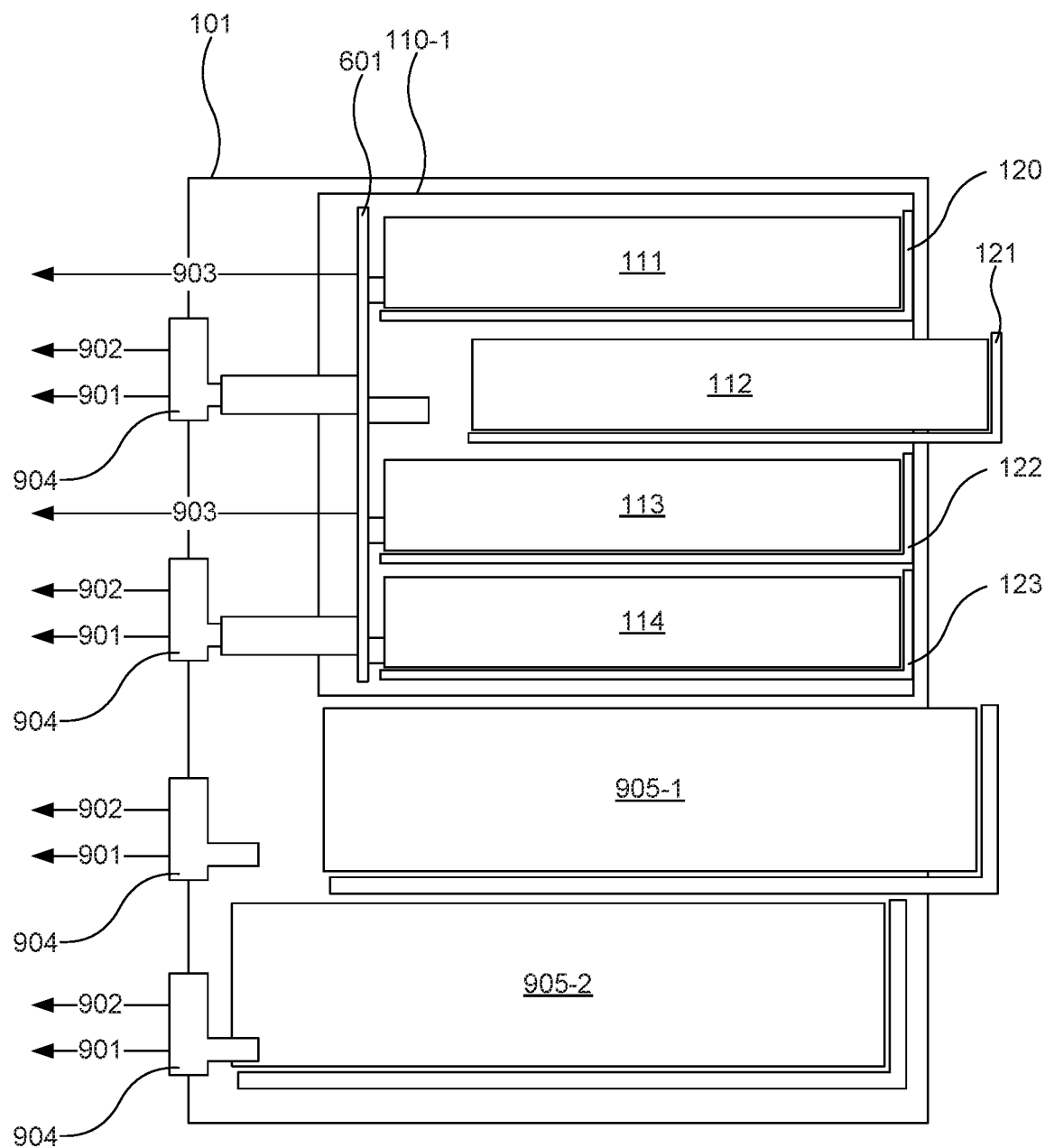
FIG. 10 is a block diagram of the internal storage bay of FIG. 1 including a number of individual storage device carriers and associated storage devices inserted therein, according to one example of the principles described herein.

FIG. 9 is a block diagram of the internal drive space (106) of FIG. 1 depicting a storage device carrier assembly (110-1, 110-2) inserted therein, according to one example of the principles described herein. FIG. 10 is a block diagram of the internal drive space (106) of FIG. 10 including a number of storage device carriers (120 through 127) and associated storage devices (111 through 118) inserted therein, according to one example of the principles described herein. Two LFF storage devices (905-1, 905-2) are depicted in FIGS. 9 and 10 to demonstrate that LFF storage devices (905-1, 905-2) take up significant space within the internal drive space (106) and to also demonstrate how the storage device carrier assemblies (110-1, 110-2) couple to the interfaces (904) of the internal storage bays in comparison to the LFF storage devices (905-1, 905-2). However, all the LFF storage devices (905-1, 905-2) may be removed from the internal drive space (106) and replaced with a number of storage device carrier assemblies (110-1, 110-2). Thus, a second storage device carrier assembly (110-2) may replace the LFF storage devices (905-1, 905-2) as the first storage device carrier assembly (110-1) is depicted. Examples described herein increase storage and computing capability of the computing system (100) without incurring the costs of storage expansion infrastructure in the base platform of the computing system.

As mentioned above, a backplane (906) of the internal drive space (106) includes a number of interfaces (904). In the example of FIGS. 9 and 10, the backplane (906) includes four interfaces (904). If four LFF storage devices, two of which are LFF storage devices (905-1, 905-2) depicted in FIGS. 9 and 10, were utilized within the internal drive space (106), then each of the four LFF storage devices (905-1, 905-2) would use one of the four interfaces (904). In order to double the number of storage devices, the four LFF storage devices (905-1, 905-2) are removed, and two of the storage device carrier assemblies (110-1, 110-2) are inserted into the internal drive space (106). FIGS. 9 and 10 depict two LFF storage devices (905-1, 905-2) remaining in the internal drive space (106) in order to contrast the topology the LFF storage devices (905-1, 905-2) require and the topology of the storage device carrier assembly (110-1, 110-2) and its associated elements.

In this example, the four interfaces are blind-mate connectors that mate with the blind-mate connectors (703) of the storage device carrier assembly (110-1, 110-2). Because the storage device carrier assemblies (110-1, 110-2) comprise the alignment rails (303-1, 303-2), the storage device carrier assemblies (110-1, 110-2) align with the four interfaces (904) located on the backplane (906) of the internal drive space (106). Each of the four interfaces (904) include a signal component (901) and a power component (902). By connecting the four interfaces (904) to the interfaces (703), the interfaces (703) are able to provide both signal transmission and power to a number of storage devices (111 through 118).

In order to provide data transfer for the first and third storage devices (111, 113), an additional signal line is coupled to the backplane (601) of the storage device carrier assembly (110-1, 110-2). As described above, two interface cables (FIG. 7, 705) are coupled to the interface connectors (FIG. 7, 704) to provide such connectivity. The above addition of storage device carrier assembly (110-1) may be repeated for storage device carrier assembly (110-2). In this manner, four additional storage devices (111 through 118) within the storage device carrier assemblies (110-1, 110-2) may be coupled to the computing system as compared to examples that use four LFF storage devices (905-1, 905-2) within the entirety of the internal drive space (106). This doubles the number of storage devices in the computing system (100).

As depicted in FIG. 10, any one of the SFF storage devices (111 through 118) may be individually removed from the storage device carrier assemblies (110-1, 110-2) and from within the internal drive space (106) of the computing system (100) without requiring the removal of any other storage devices (111 through 118). Storage device 112 is depicted as being removed or separated from the remainder of the system without affecting the remaining storage devices (111 through 118). Similarly, any one of the storage device carrier assemblies (110-1, 110-2) may be individually removed from the internal drive space (106) of the computing system (100) without requiring the removal of another storage device carrier assembly (110-1, 110-2) or any of the storage devices (111 through 118) coupled to the storage device carrier assemblies (110-1, 110-2). This creates a computing environment wherein a user may dynamically change the computing topology of the computing system (100) without the need of tools. This significantly reduces time that may otherwise be required to adjust the topology or service of the computing system (100).

With the above, the storage device carrier assemblies (110-1, 110-2) provide flexibility to install a variety of storage device form factors and technologies in a common drive space of internal drive space (106). In one example, each storage device carrier assembly (110-1, 110-2) may be configured with up to four SFF SAS/SATA devices or up to two SFF PCIe storage devices. In another example, each storage device carrier assembly (110-1, 110-2) may be configured with up to four SFF PCIe storage devices based on the example of FIG. 8 wherein two additional PCIe interfaces (801) are included on the backplanes (601) of the storage device carrier assemblies (110-1, 110-2).

Once the storage device carrier assemblies (110-1, 110-2) are installed in the computing system (100), the storage devices (111 through 118) may be independently accessed without the need to remove the entire storage device carrier assembly (110-1, 110-2) from the computing system (100). However, as an optional assembly, the storage device carrier assemblies (110-1, 110-2) may be removed to return the computing system (100) to its original configuration. Removal of the storage device carrier assemblies (110-1, 110-2) from the computing system (100) may be executed with the storage device carrier assemblies (110-1, 110-2) fully populated with the storage devices (111 through 118). This provides users with a convenient way to remove multiple storage devices at once while keeping them secured in the storage device carrier assemblies (110-1, 110-2).

The specification and figures describe a storage device carrier assembly for providing independent device access of a plurality of storage devices. The storage device carrier assembly includes a device cage, at least one device cage rail coupled to the outside of the device cage to couple the device cage to a chassis of a computing system, and a plurality of storage device carrier assembly rails coupled to the inside of the device cage to couple a plurality of storage device carriers to the device cage. Each of the storage device carriers houses a storage device. The storage device carrier assembly also includes a backplane coupled to the device cage to electrically couple a number of the storage devices to the computing system. The backplane includes a number of combination signal and power interfaces located on a first side of the backplane to couple a number of the storage devices to the backplane. The backplane further includes a number of combination signal and power interfaces located on a second side of the backplane to couple the backplane to the computing system, and a number of signal connectors to couple the backplane to the computing system.

This storage device carrier assembly may have a number of advantages, including: (1) offering storage expansion and new capabilities to an existing computing system; (2) allows for higher quantity of storage devices for increased Redundant Array of Independent Drives (RAID) functionality and performance; (3) as an optional component, the storage device carrier assembly enables users to return their computing system to its original configuration; (4) installs and uninstalls tool-free, with or without storage devices loaded; (5) full tool-free installation and removal design for the storage devices, storage device carriers, and storage device carrier assembly; (6) access to the storage device carrier assembly and installed storage devices may be secured behind a lockable access panel of the computing system; (7) the storage device carrier assembly can be compatible with multiple computing systems; (8) the storage device carrier assembly supports SAS, SATA, and PCIe storage devices, and can be easily modified to accept future storage device technologies; (9) the storage device carrier assembly may be removed from the computing system with the storage devices and storage device carriers still installed in the storage device carrier assembly allowing users to secure the entire four device assembly; (10) provides independent drive access within a computing system such that the storage device carrier assembly does not need to be removed to access individual storage devices; (11) the base computing system does not incur the cost of storage expansion infrastructure requirements; (12) spacing between the storage devices and spacing between the storage device carriers provides air channels for system and device cooling; and (13) the computing system may be configured with multiple storage device carriers and storage device carrier assemblies, among other advantages.

The preceding description has been presented to illustrate and describe examples of the principles described. This description is not intended to be exhaustive or to limit these principles to any precise form disclosed. Many modifications and variations are possible in light of the above teaching.

What is claimed is:

1. A computer system comprising:
   a system backplane including an array of first connectors;
   wherein each of the first connectors is directly electrically connectable to any of a first type of storage device and a carrier assembly for supporting a plurality of a second type of storage device,
   wherein the system backplane supports multiple storage protocols,
   wherein the multiple storage protocols include Peripheral Component Interconnect Express (PCIe) protocol and Serial Advanced Technology Attachment (SATA) protocol,
   wherein the carrier assembly comprises a PCIe connector.

2. The computer system of claim 1, wherein a data storage device of the first type has a different form factor than a data storage device of the second type.

3. The computer system of claim 1, wherein the carrier assembly comprises both a SATA connector and a PCIe connector.

4. The computer system of claim 1, including support for Serial Attached Small Computer System Interface (SAS) protocol, wherein an interior of the carrier assembly comprises an SAS/SATA connector and an SAS/SATA/PCIe connector.

5. The computer system of claim 1, wherein wherein an exterior of the carrier assembly comprises a PCIe connector.

6. The computer system of claim 3, wherein an exterior of the carrier assembly comprises both a PCIe connector and an SATA connector.

7. A computer system comprising:
   a housing defining an internal drive space;
   a system backplane located in the internal drive space, the backplane including an array of first connectors for a first type of storage device, the first connectors directly electrically connectable to the first type of storage device;
   a cage for supporting a plurality of a second type of storage device; and
   a cage backplane on the cage;
   wherein the cage backplane comprises a connector for connection to one of the first connectors of the system backplane;
   wherein the cage backplane further comprises an array of second connectors for a second type of storage device, the second connectors being inside the cage;
   wherein storage devices of the second type are independently releasable from the cage while the cage remains connected to the system backplane;
   wherein a data storage device of the first type has a different form factor than a data storage device of the second type;
   wherein the system supports multiple storage protocols including Peripheral Component Interconnect Express (PCIe) protocol and Serial Advanced Technology Attachment (SATA) protocol; and
   wherein the cage comprises both a SATA connector and a PCIe connector.

8. The computer system of claim 7, wherein an exterior of the cage comprises both a PCIe connector and a SATA connector.

9. The computer system of calm 7, wherein an interior of the cage comprises a SATA connector and a PCIe connector.

10. The computer system of claim 7, wherein the cage retains a storage device of the second type within a storage device carrier having a flexible rail and a pin on the flexible rail.

11. The computer system of claim 10, further comprising a rib that connects the flexible rail and an additional rail of the storage device carrier.

12. The computer system of claim 11, wherein the rib comprises a pivot about which the flexible rail moves.

13. The computer system of claim 7, wherein the cage further comprises a latch for latching to a space in the internal drive space.

14. The computer system of claim 7, wherein all of the storage devices of both the first and second types are independently releaseable from the cage or system backplane.

15. A computer system comprising:
   a housing defining an internal drive space;
   a system backplane located in the internal drive space, the backplane including an array of first connectors for a first type of storage device, the first connectors directly electrically connectable to the first type of storage device;
   a cage for supporting a number of a second type of storage device; and
   a cage backplane on the cage;
   wherein the cage backplane comprises a connector for connection to one of the first connectors of the system backplane;
   wherein the cage backplane further comprises an array of second connectors for a second type of storage device, the second connectors being inside the cage;
   wherein the system backplane supports multiple storage protocols for both the first and second types of storage device;
   wherein the cage backplane comprises a second connector for connection to a second of the first connectors of the system backplane such that, when the cage is in place in the internal drive space, the cage backplane connects to two of the first connectors of the system back plane; and wherein either an exterior or an interior of the cage comprises both a Peripheral Component Interconnect Express (PCIe) connector and Serial Advanced Technology Attachment (SATA) connector.

16. The computer system of claim 15, wherein the cage supports a plurality of the second type of storage device.

17. The computer system of claim 15, wherein a form factor of the first type of storage device is different from a form factor of the second type of storage device.

* * * * *